US006701076B2

(12) United States Patent
Tsai

(10) Patent No.: US 6,701,076 B2
(45) Date of Patent: Mar. 2, 2004

(54) CAMERA WITH A FOCUS RETAINING MECHANISM

(75) Inventor: Chen-Shuo Tsai, Tai-Chung Hsien (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 10/063,899

(22) Filed: May 22, 2002

(65) Prior Publication Data

US 2003/0081949 A1 May 1, 2003

(30) Foreign Application Priority Data

Oct. 25, 2001 (TW) .................................... 90126450 A

(51) Int. Cl.$^{7}$ ............................ G02B 7/04; G03B 13/10

(52) U.S. Cl. ........................ 396/144; 396/132; 396/133

(58) Field of Search ................................ 396/130, 132, 396/144, 133, 463

(56) References Cited

U.S. PATENT DOCUMENTS 4,985,724 A * 1/1991 Akimoto et al. ............ 396/132
5,680,649 A * 10/1997 Akimoto et al. ............ 396/132
5,710,949 A * 1/1998 Akimoto et al. ............ 396/132

* cited by examiner

*Primary Examiner*—Russell Adams
*Assistant Examiner*—Arthur A Smith
(74) *Attorney, Agent, or Firm*—Winston Hsu

(57) ABSTRACT

A focus retaining mechanism of a camera is disclosed. The camera includes a base, a focusing lens, a retaining member, and a retaining hook. The base has a cylindrical and vertical opening in it. The focusing lens is rotationally fixed within the opening. The retaining member is horizontally and movably fixed in the base. The horizontal sides of the retaining member include a ratchet side, a smooth side, a first end and a second end positioned over the connecting portions of the ratchet side and the smooth side. The retaining hook has a horizontal arm and a vertical arm installed under the horizontal arm. The horizontal arm can move horizontally across the upper side of the retaining member, and the vertical arm can thus contact each of the horizontal sides of the retaining member.

14 Claims, 5 Drawing Sheets

CAMERA WITH A FOCUS RETAINING MECHANISM

BACKGROUND OF INVENTION

1. Field of the Invention

The present invention relates to a focus retaining mechanism, and more particularly, to a focus retaining mechanism of a camera.

2. Description of the Prior Art

Please refer to FIG. 1 of a top view of a conventional lens driving device 10 of a camera. The lens driving device 10 is disclosed in U.S. Pat. No. 5,680,649 "LENS DRIVING DEVICE FOR AUTO-FOCUS CAMERA". The lens driving device 10 comprises a base 12 comprising a cylindrical opening16, a focusing lens 14 rotatably mounted within the opening16, a lens setting ring 40 rotatably mounted on the periphery of the opening 16 on the base 12, a driving ring 44 mounted on the base 12 by hooking the lens setting ring 40, a cam portion 42, a lens barrel 18 mounted on the base 12 by hooking the lens setting ring 40 and the cam portion 42, a first bi-directional driving motor 20 and a second bidirectional driving motor 30 mounted on the base 12, a spring 34 mounted on the base 12, and a retainer member 22 disposed on the base 12. In addition, a cylindrical projection 46 disposed on the lens setting ring 40 hooks an engaging portion 19 of the lens barrel 18. Thus, when the lens setting ring 40 is rotated, the lens barrel 18 and the focusing lens 14 are also rotated. The second bidirectional driving motor 30 is used to rotate the driving ring 44 for controlling a shutter. The first bi-directional driving motor 20 is used to drive the retainer member 22 for mounting the cam portion 42 in a predetermined position so as to rotate the focusing lens 14 to a corresponded position. Moreover, an idler gear 70 and a first ratchet 50 are used for the transmission between the cam portion 42 and the retainer member 22.

As shown in FIG. 1, when the second bi-directional driving motor rotates the driving ring 44 toward a positive direction via a second ratchet 32 to control an opening position of the shutter, the driving ring 44 moves the lens setting ring 40 so as to rotate the lens barrel 18 and focusing lens 14. At the same time, the lens setting ring 40 also moves the retaining member 22 so that a plurality of gear portions 43 hook with a hold lever 60 one by one. The retaining member 22 rotates the first ratchet 50 by hooking the idler gear 70.

When the second bi-directional driving motor 30 moves the driving ring 44 toward a positive direction to a predetermined position, which is an appropriate position for focusing, the first bi-directional driving motor 20 controls the retainer member 22 to stop rotating the first ratchet 50. At this time, a pull-back action to the retaining member 22 generated by the flexible component 34 is stopped due to the stop action of the retainer member 22. Thus, the lens barrel 19 and the driving ring 44 do not circumrotate so that the lens driving device 10 can focus and retain position. At this time, the driving ring 44 moves to a predetermined shutter position and opens the shutter, and the lens barrel 18 also drives the focusing lens 14 to rotate to a corresponding position.

The second bi-directional driving motor 30 continues to rotate in a positive direction and moves the driving ring 44 to an utmost position 45. At the same time, the first bi-directional driving motor 20 drives the retainer member 22 to rotate the first ratchet 50 so that the first ratchet 50 and the cam portion 42 rotate to corresponding utmost positions.

At this time, the second bi-directional driving motor 30 provides no power to the lens driving device 10. That means after the second bi-directional driving motor 30 moves the driving ring 44 to a utmost position 45, only the first bi-directional driving motor 20 provides a small amount of power to back focus retaining structures such as the first ratchet 50, the cam portion 42, the lens barrel 18, the driving ring 44, and the flexible component 14 to an initial state. After the first bi-directional driving motor 20 drives the retainer member 22 and the first ratchet 50 to their utmost positions, the first ratchet 50 does not contact with the retainer member 22, and a spring 62 disposed on the base 12 pulls the hold lever 60 back to the initial state. This is an action of closing the shutter. In addition, the flexible component 34 also pulls the cam portion 42 back to the initial state so that the driving ring 44, lens barrel 18, and the first ratchet 50 are also moved back to the initial states.

As described above, the conventional lens driving device 10 has a complicated focus retaining structure, and a retainer member and a gear assembly are needed. Thus, the complexity and costs of components are increased. This highly complicated structure hardly reduces costs of assembly. In addition, although the retainer member 22 acts effectively, the available space of the lens driving device 10 is decreased with the use of the retainer member 22.

SUMMARY OF INVENTION

It is therefore a primary objective of the claimed invention to provide a focus retaining mechanism to solve the above-mentioned problems.

The claimed invention provides a focus retaining mechanism of a camera. The camera comprises a base, a focusing lens, a retaining member, and a retaining hook. The base comprises a cylindrical and vertical opening therein. The focusing lens is rotationally fixed within the opening. The retaining member is horizontally and movably fixed in the base. The horizontal sides of the retaining member include a ratchet side, a smooth side, a first end and a second end positioned over the connecting portions of the ratchet side and the smooth side. The retaining hook has a horizontal arm and a vertical arm installed under the horizontal arm. The horizontal arm can move horizontally across the upper side of the retaining member, and the vertical arm can thus contact each of the horizontal sides of the retaining member.

It is an advantage of the claimed invention that a focus retaining mechanism of a camera with a simple design is used for simplifying the focus retaining mechanism These and other objectives of the present invention will no doubt become obvious to those of ordinary skill in the art after reading the following detailed description of the preferred embodiment, which is illustrated in the various figures and drawings.

DETAILED DESCRIPTION

Figure 1:
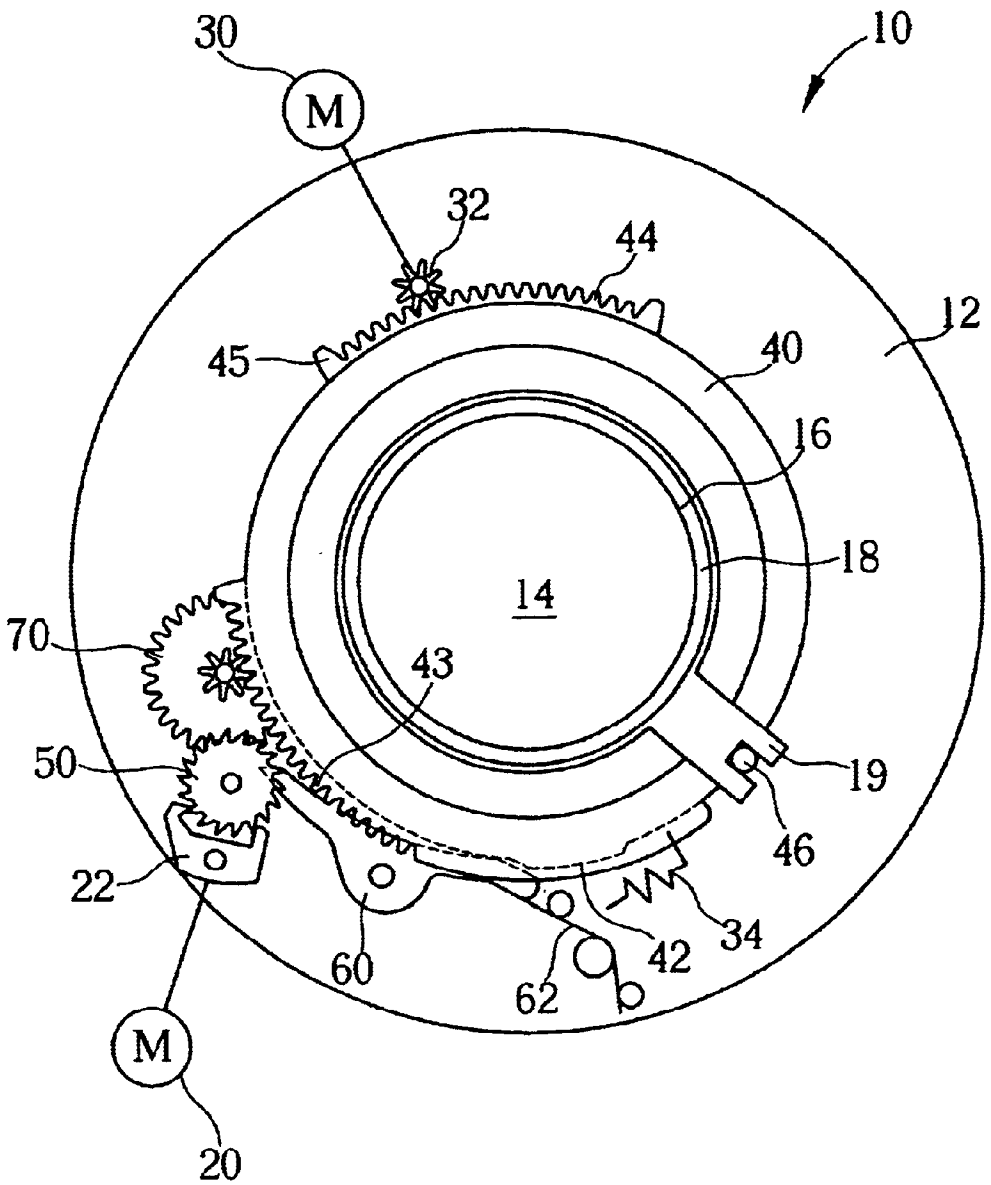
FIG. 1 is a top view of a lens driving device in the prior art.
Figure 2:
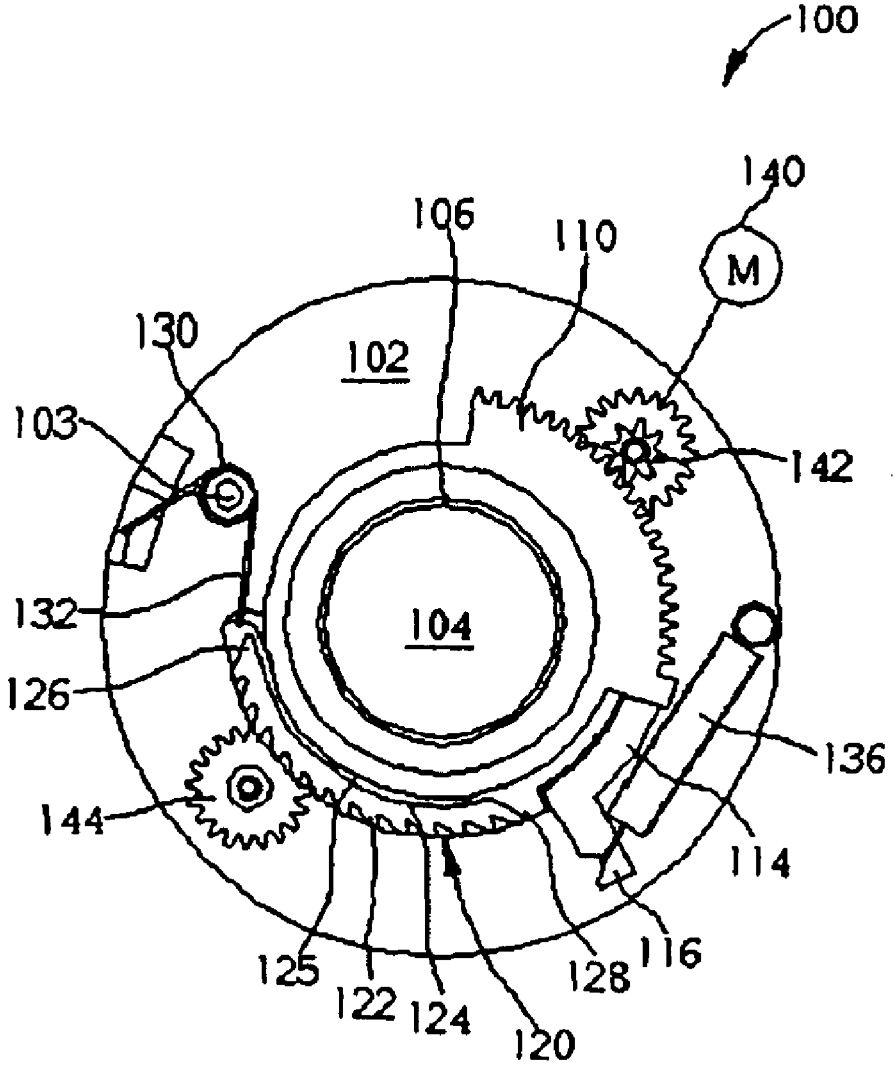
FIG. 2 is a simplified top view of a lens driving device in the first embodiment of the present invention.
Figure 3:
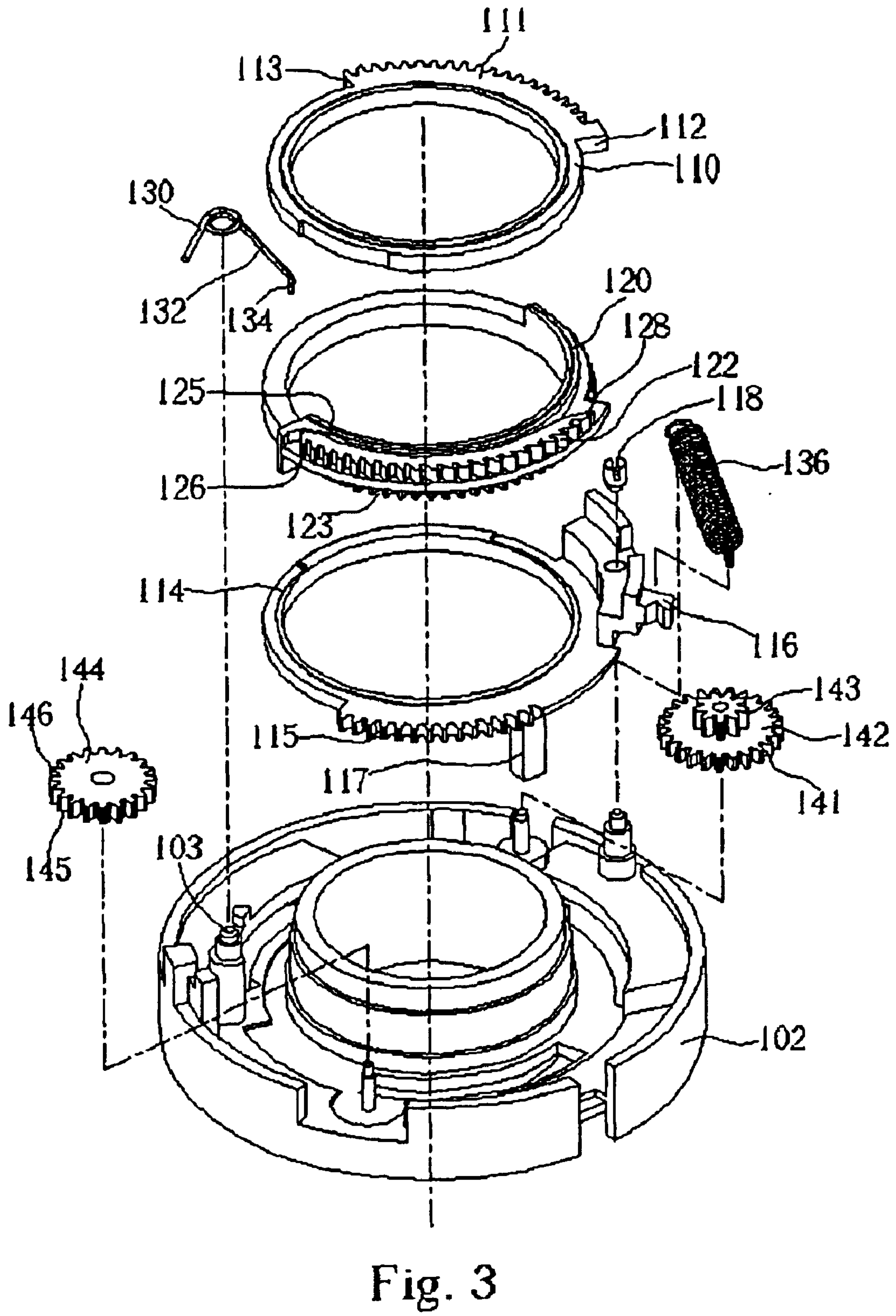
FIG. 3 is an exploded diagram of all components of the lens driving device shown in FIG. 2.
Figure 4:
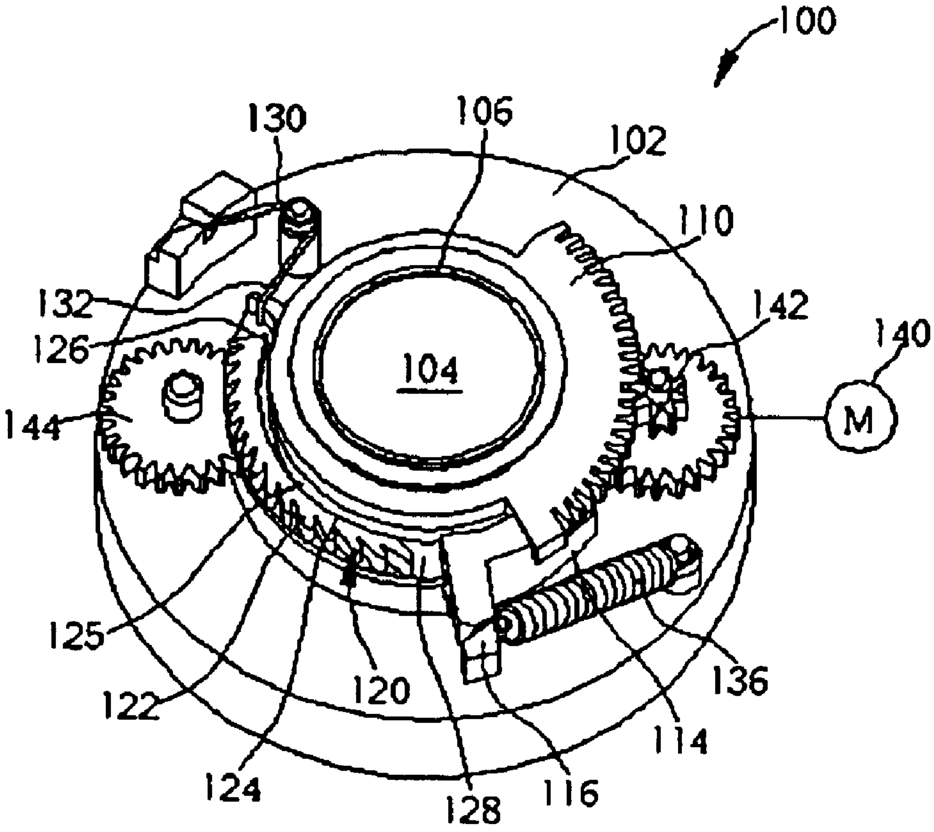
FIG. 4 is a simplified front view of the lens driving device shown in FIG. 3.

In the present invention, mechanisms for moving a shutter and method thereof are the same as the prior art shown in FIG. 1 . Please refer to FIG. 2, FIG. 3, and FIG. 4. FIG. 2 is a simplified top view of a lens driving device 100 of a first embodiment of the present invention. FIG. 3 is an exploded diagram of components of the lens driving device 100 in FIG. 2. FIG. 4 is a simplified front view of the lens driving device 100 in FIG. 3 after assembly.

As shown in FIG. 2 and FIG. 3, the lens driving device 100 comprises a base 102 comprising a cylindrical lens barrel 106, a focusing lens 104 rotatably mounted on the lens barrel 106, a connecting ring 114, a retaining member 120 and a driving ring 110 rotatably mounted on the periphery of the base 12, a retaining hook 130 mounted on the base 102, a flexile component 136 mounted on the base 102, a driving motor 140 mounted on the base 102, and a first gear 142 and a second gear 144 mounted on the base 102 by hooking with the driving ring 110 and the retaining member 120 respectively.

The retaining member 120 is an arc-shaped component with a ratchet side in the horizontal direction on an outer side of the retaining member 120, a smooth side 124 with a sidewall of a guide groove 125 on an inner side of the retaining member 120, a first end 126 and a second end 128 disposed on two ends between the ratchet side 122 and the smooth side 124. A gear side 123 disposed on the bottom of the ratchet side 122 comprises a plurality of gears as a transmission interface. In addition, the retaining hook 130 comprises a horizontal arm 132 movably mounted on the base 102 and a vertical end 134 mounted beneath the horizontal arm 132. The horizontal arm 132 and the vertical end are monolithically formed by a flexible material such as metallic wire. The middle portion of the metallic wire is ring like and surrounds a shaft 103 on the base 102. Both ends of the metallic wire extended from the middle portion together form a "V" shape. The horizontal arm 132 and the vertical end 134 are formed on one end. The other end props up the sidewall of the base 102. Thus, one end of the horizontal arm 132 is mounted on the shaft 103 so as to rotate flexibly.

The flexible components 36 is connected to a transmission lever 113 on the connecting ring 114 for mounting the connecting ring 114 flexibly so as to move and hook the driving ring 110 and the retaining member 120. The driving ring 110 comprises a gear side 111 extruded to the ringlike edge for hooking a top gear portion 143 of the first gear 142. The driving motor 140 drives the first gear 142 to rotate via the bottom gear portion 141 of the first gear 142. Since the top gear portion 143 of the first gear 142 has a smaller diameter than the bottom gear portion 141, the first gear 142 shrinks the rotating momentum of the related motion of the driving ring 110 to the driving motor 140. The second gear 144 is an amplifying gear with an upside-down design of the first gear 142. The second gear 144 comprises a bottom gear portion 145 hooking with the gear side 115 of the connecting ring 114 and a top gear portion 146 hooking with the gear side 123 of the retaining member 120. The connecting ring further comprises a lens connecting lever 117. When the driving motor 140 drives the first gear 142 to rotate, a front end 112 of the gear side 111 of the driving ring 110 urges the lever 118 on the driving ring 114 so that the connecting ring 114 urges the second gear 144 to rotate so as to move the retaining member 120. At the same time, the lens connecting lever 117 on the connecting ring 114 moves the focusing lens 104 downward rotatably. The horizontal arm 132 on the retaining hook 130 moves horizontally above the retaining member 120 so that the vertical end 134 of the horizontal arm 132 touches each horizontal side of the retaining member 120. In addition, the sidewall of a guide groove 125 on the smooth side 124 of the retaining member 120 is used to place the vertical end 134 of the retaining hook 120. When vertical end 134 of the retaining hook 130 passes through the second end 128 of the retaining member 120, the vertical end 134 is guided to the sidewall of a guide groove 125 of the smooth side 124. The sidewall of the guide groove 125 of the smooth side 124 guides the vertical end 134 along the smooth side 124 to the first end 126 of the retaining member 120.

As shown in FIG. 4, when the driving motor 130 urges the driving ring 110 to rotate in a positive direction via the first gear 142, the driving ring 110 moves the connecting ring 114 so that the lens connecting lever 117 on the connecting ring 114 moves the focusing lens 104 downward rotatably along the lens barrel 106. At the same time, the connecting ring 114 moves the retaining member 120 via the second gear 144. A pull-back force generated by the flexible component 136 acts on the transmission lever 116 on the connecting ring 114. The vertical end 134 of the retaining hook 130 contacts the ratchet side 122 of the retaining member 120 at the first end 126 and slides along the ratchet side 122. When the driving motor 140 keeps the driving ring 110 moving in the positive direction to a predetermined position, which is a proper position for focusing, the driving motor 140 stops to move the focusing lens 104 downward via the connecting ring 114. At the same time, the vertical end 134 of the retaining hook 130 hooks with the ratchet side 122 of the retaining member 120. Thus, the position of the retaining member 120 is fixed without moving by the elastic force generated by the flexible component 136 to achieve functions of focusing and retaining.

The ratchet side 122 comprises a plurality of ratchets. Each ratchet provides the focusing lens with a focusing position for satisfying the requirement of different focusing positions. Since a number of the ratchets is corresponding to a number of focusing levels, more focusing positions can be obtained by increasing a number of teeth in the first gear 142 and the second gear 144. Therefore, the focus control can be improved.

After the focusing lens 104 completes the action of focusing and retaining, the driving motor 140 reverses. At this time, the retaining member 120 and the connecting ring 114 remain in the retained position, but the driving ring 110 is urged to rotate in an opposite direction so as to move a shutter switch using another end 113 of the gear side 111 to complete a photographing action.

After finishing the photographing action, the driving motor 140 turns to rotate in the positive direction and moves the focusing lens 10 downward rotatably via the connecting ring 114. Finally, the vertical end 134 of the retaining hook 130 leaves the ratchet side 122 of the retaining member 120, passes through the second end 128 of the retaining member 120 and contacts with the smooth side 124 of the retaining member 120. At this time, the focus retaining mechanisms of the lens driving device 100, such as the driving ring 110, retaining member 120 and the flexible component 126, already reach corresponded limiting positions. After that, the flexible component 136 pulls the connecting ring 114 so that the lens connecting lever 117 on the connecting ring 114 moves the focusing lens 104 upward rotatably along the lens barrel 106 and the retaining member 120 is rotated in an opposite direction due to the transmission of the second gear 144. When the flexible component 136 pulls the connecting ring 114 and makes the retaining member 120 rotate reversibly, the driving motor 140 also rotates reversibly so as to prevent generating a reverse rotating force on the retaining member 120. At this time, the vertical end 134 of the retaining hook 130 slides along the sidewall of the guide groove 125 on the smooth side 124 of the retaining member 120 until passing through the first end 126 of the retaining member 120 to the initial state. In the same manner, the focus retaining mechanism of the lens driving device 100, such as the driving ring 110, the retaining member 120 and the flexible component 136, also back to their initial positions. Thus, a focus retaining process of the lens driving device of the camera 100 is completed.

Figure 5:
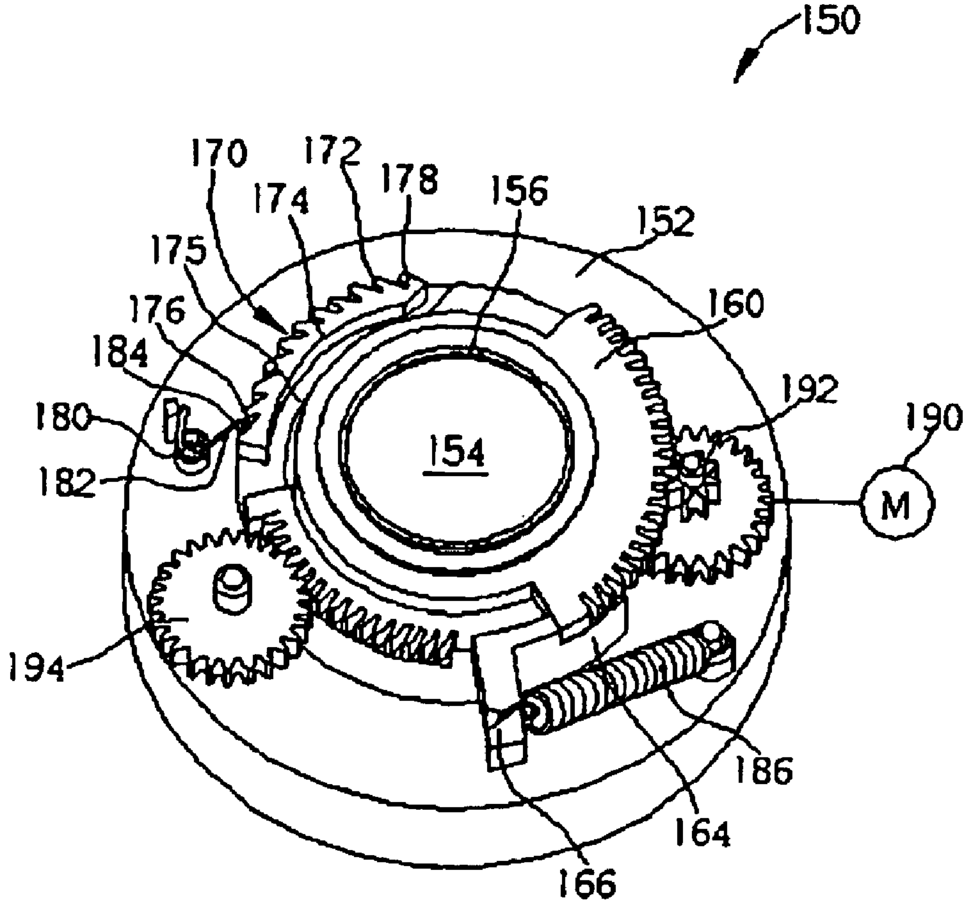
FIG. 5 is a simplified front view of a lens driving device in the second embodiment of the present invention.

Please refer to FIG. 5 of a simplified top view of a lens driving device 150 of a second embodiment in the present invention. As with the first embodiment, the lens driving device 150 also comprises a base 152 comprising a cylindrical lens barrel 156, a focusing lens 154 rotatably mounted in the lens barrel 156, a driving ring 160 rotatably mounted on the periphery of the lens barrel 156, a retaining member 170 rotatably mounted on the periphery of lens barrel 156, a flexible component 186 mounted on the base 152, a connecting ring 164 mounted on the base 152 with hooking the driving ring 160, a retaining hook 180 disposed on the base 152, a driving motor 190 mounted on the base 152, and a first gear 192 and a second gear 194 disposed on the base 152 by hooking with the driving ring 160 and the connecting ring 164 respectively. The retaining member 170 is ring like with an arc-shaped side in a horizontal direction which comprises a ratchet side 172 in an outer side and a smooth side 174 with a sidewall of a guide groove 175 thereof in an inner side, a first end 176 and a second end 178 disposed on two ends between the ratchet side 172 and the smooth side 174. In addition, the retaining hook 180 comprises a horizontal arm 182 with one end mounted on the base 152 and a vertical end 184 mounted on a bottom of the horizontal arm 182. The horizontal arm 182 and the vertical end 184 can be formed monolithically by a flexible material such as a metallic wire.

The flexible component 186 is connected to a transmission lever 166 of the connecting ring 164 so as to mount the connecting ring 164 flexibly and drive a fixing effect of the driving ring 160 and the retaining hook 180. The driving motor 190 is used to rotate the first gear 192 so that the retaining member 170 rotates in a first direction. The flexible component 186 is used to provide a driving force of rotating in the first direction or a second direction, which is opposite to the first direction. The connecting ring further comprises a lens connecting lever (not shown in FIG. 5). When the driving motor 190 rotate the first gear 192, the transmission effect of the driving ring 160 and the connecting ring 164 makes the second gear 194 rotate. At the same time, the lens connecting lever on the connecting ring 164 urges the focusing lens 154 to move downward rotatably. The horizontal arm 182 on the retaining hook 180 moves horizontally over the retaining member 170 so that the vertical end 184 mounted beneath the horizontal arm 182 can touch horizontal sides of the retaining member 170. In addition, the sidewall of the guide groove 175 on the smooth side 174 of the retaining member 170 is used to place the vertical end 184 of the retaining hook 180. When the vertical end of the retaining hook 180 passes through the second end 178 of the retaining member 170, the vertical end 184 is guided into the sidewall of the guide groove 175 on the smooth side 174. The sidewall of the guide groove 175 on the smooth side 174 guides the vertical end 184 to slide along the smooth side 174 to the first end 176 of the retaining member 170.

When the driving motor 190 urges the driving ring 160 to rotate toward a first rotating direction via the first gear 192, the driving ring 160 urges the connecting ring 164 so as to urge the lens connecting lever on the connecting ring 164 in advance so that the focusing lens 152 moves downward rotatably along the lens barrel 156. An elastic force of the flexible component 186 acts on the transmission lever 166 of the connecting ring 164. At this time, the vertical end 184 of the retaining hook 180 moves from the first end 176 of the retaining member 170 to the ratchet side 172 of the retaining member 170 and slides along the ratchet side 172.

When the driving motor 190 continues to urge the driving ring 160 to rotate in the first direction to a predetermined position, which is a proper focusing position, the driving motor 190 stops moving the focusing lens 154 downward via the connecting ring 164. At this time, the vertical end 184 of the retaining hook 180 hooks with the ratchet side 172 of the retaining member 170 so that the position of the retaining hook 180 is fixed without moving by the elastic force generated by the flexible component 136 to achieve functions of focusing and retaining.

The driving motor 190 continues to move the focusing lens 154 rotatably downward via the retaining member 170, the vertical end 184 of the retaining hook 180 leaves the second end 178 of the retaining member 170 and moves toward the smooth side 174 of the retaining member 170. At this time, the focus retaining mechanisms of the lens driving device 150, such as the driving ring 160, the connecting ring 164, and the flexible component 186, are in the limiting position. After that, the flexible component 186 pulls the retaining member 170 via the connecting ring 164 so that the vertical end 184 of the retaining hook 180 slides along the sidewall of the guide grooves 175 on smooth side 174 of the retaining member 170 in the opposite direction until it passes the first end 176 of the retaining member 170 and back to the initial state. At the same time, the lens connecting lever on the connecting ring 164 also urges the focusing lens 154 to move upward rotatably along the lens barrel 156. Thus, a focus retaining process of the lens driving device of the camera 150 is completed.

Comparing FIG. 4 and FIG. 5, the retaining hooks 130 and 170 are used to fix the retaining members 120 and 170 in a way of hooking or propping respectively. Of course, there are some other ways to stop the retaining member from reversing. In addition, the retaining hooks can be movably disposed on the connecting ring or other mechanism rotating with the periphery of the lens barrel. At this case, the retaining member is fixed but the retaining hook is movable. An opposite operating method of the embodiment described above is also a modification or alteration of the claimed invention. In addition, the driving motors and the flexible components shown in FIG. 4 and FIG. 5 can be replaced by other proper driving devices.

The ratchet side and the smooth side or the shape of the guide groove shown in FIG. 2 to FIG. 5 can be rearranged in other ways which can provide the retaining member sliding path for rotating in a positive and a negative direction. Besides the composition of a horizontal arm and a vertical end substantially as shown in FIG. 2 to FIG. 5, the retaining hook can be formed of other materials or shapes. The only requirement is the portion of the retaining member hooking with the gear can slide along the ratchet side flexibly when the retaining member rotates in a positive direction. The flexible components in FIG. 2 to FIG. 5 can be replaced by any other driving components that can provide a reverse driving force for rotating.

In contrast with the prior art, the lens driving devices 100 and 150 in the present invention are obviously different. The focus retaining mechanisms of the lens driving devices 100 and 150 only use retaining hooks 130 and 180, which is designed simply, for retaining without adding any other electric device or gear sets. Thus, more space inside the lens driving device of camera is available and the manufacturing cost is also reduced.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A camera with a focus retaining mechanism, comprising:

a base having a cylindrical lens barrel;

a focusing lens mounted within the lens barrel, the focusing lens movable in a first or a second direction along an optical axis;

a retaining member horizontally and movably mounted on the base for setting the focusing lens in a predetermined position, wherein the retaining member comprises a ratchet side, a smooth side opposite the ratchet side, a first end and a second end positioned on opposite ends of the ratchet side and the smooth side; and a retaining hook movably mounted on the base, the retaining hook comprising a horizontal arm, which has a vertical end downwardly extending to hook the retaining member and moving substantially over the retaining member horizontally;

wherein when the focusing lens moves in the first direction, the vertical end of the retaining hook contacts the first end of the retaining member and then slides along the ratchet side; when the focusing lens stops, the vertical end of the retaining hook hooks the ratchet side to set the focusing lens; and when the focusing lens moves to the second direction, the vertical end slides back along the smooth side to the first end.

2. The camera with a focus retaining mechanism according to claim 1, wherein the horizontal arm and the vertical end of the retaining hook are monolithically made from a flexible metallic wire.

3. The camera with a focus retaining mechanism according to claim 1, further comprising:

a flexible component mounted on the base for flexibly holding the retaining member; and a driving motor mounted on the base for urging the retaining member;

wherein when the driving motor urges the retaining member to move the focusing lens, the focusing lens moves in the first direction within the lens barrel and the vertical end of the retaining hook contacts the first end of the retaining member and then slides along the ratchet side; when the focusing lens stops moving, the vertical end of the retaining hook hooks the ratchet side and to set the focusing lens; and when the focusing lens continues to move in the first direction, the vertical end of the retaining hook passes the second end of the retaining member, separates from the ratchet side, and then positions along the smooth side; thereafter when the focusing lens starts to move in the second direction, the vertical end slides back along the smooth side to the first end.

4. The camera with a focus retaining mechanism according to claim 3, further comprising:

a driving ring mounted atop the retaining member; and a connecting ring movably mounted beneath the retaining member;

wherein the driving motor urges the retaining member through the driving ring and the connecting ring.

5. The camera with a focus retaining mechanism according to claim 4, wherein the driving ring and the connecting ring are rotatably mounted in the periphery of the lens barrel.

6. The camera with a focus retaining mechanism according to claim 1, wherein the retaining member is arc-shaped with an inner side and an outer side, and wherein the ratchet side and the smooth side are separately located on the inner side and the outer side.

7. The camera with a focus retaining mechanism according to claim 6, wherein the retaining member is rotatably mounted on the lens barrel of the base.

8. The camera with a focus retaining mechanism according to claim 1, wherein the smooth side is a sidewall of a guide groove which allows the passing of the vertical end of the retaining hook from the second end to the first end of the retaining member along the smooth side.

9. A lens retaining device capable of positioning a focusing lens, comprising:

a base having a cylindrical lens barrel vertically formed at the center part of the base for accommodating the focusing lens;

a retaining member rotatably mounted on periphery of the lens barrel for controlling the position of the focusing lens in the lens barrel, the retaining member comprising a ratchet side, a smooth side opposite the ratchet side, a first end and a second end; wherein the ratchet side and the smooth side are disposed between the first end and the second end;

a first driving device for urging the retaining member to rotate in a first direction;

a second driving device for providing an urging force for the retaining member to rotate in a second direction, wherein the first direction is a reverse direction of the second direction; and a retaining hook for positioning and engaging with ratchet side of the retaining member when the retaining member rotates to a predetermined position in the first direction so as to resist the urging force provided by the second driving device that makes the retaining member rotate in the second direction, and when the retaining hook slides along the ratchet side passing the second end, the retaining hook slides into the smooth side and the second driving device urges the retaining member to rotate in the second direction.

10. The lens retaining device according to claim 9, wherein the ratchet side has a plurality of ratchets thereof, and wherein the plurality of ratchets provide a plurality of positioning states for the focusing lens.

11. The lens retaining device according to claim 10, wherein the retaining member is arc-shaped, and the ratchet side is disposed on one side of the retaining member.

12. The lens retaining device according to claim 9, wherein the retaining hook comprises:

a horizontal arm with one end fixed on the base; and a vertical end extending from the other end of the horizontal arm for engaging with ratchet side of the retaining member.

13. The lens retaining device according to claim 12, wherein when the retaining member rotates in the first direction, the vertical end of the retaining hook slides along the ratchet side from the first end to the second end; and when the focusing lens stops, the vertical end of the retaining hook hooks the ratchet side to set the focusing lens.

14. The lens retaining device according to claim 9, wherein the second driving device is a flexible component.

* * * * *